UNITED STATES PATENT OFFICE.

CARL UEBEL, OF HEIDELBERG, GERMANY.

MANUFACTURE OF NITRIC ACID.

1,141,994.   Specification of Letters Patent.   Patented June 8, 1915.

No Drawing.   Application filed September 16, 1913. Serial No. 790,137.

*To all whom it may concern:*

Be it known that I, CARL UEBEL, chemist, a subject of the German Emperor, and a resident of Bergstrasse 34, Heidelberg, Baden, Germany, have invented certain new and useful Improvements in the Manufacture of Nitric Acid, of which the following is a specification.

This invention relates to the manufacture of nitric acid from nitrates and sulfuric acid.

In the processes for manufacturing nitric acid from nitrates and sulfuric acid as heretofore known and used a mixture of nitrate and sulfuric acid in amount corresponding to the formation of bisulfate or sulfate has always been introduced into the reaction chamber either intermittently or continuously, and by gradually increased heating transformation of the nitrate by sulfuric acid and the distilling off of the nitric acid has been effected. These processes, however, have this drawback that, firstly, only a part of the nitrate is transformed by the sulfuric acid, the rest being deposited on the bottom of the reaction chamber as crystalline crust. This nitrate crust easily becomes superheated and thereby causes the foaming over of the reaction chamber or an explosion like development of gases whereby notwithstanding the most careful supervision of the retort firing there is caused a frequent puffing out of nitric acid fumes and in connection therewith danger to the workman. Secondly, in consequence of the superheating of the nitrate crust on the bottom of the retort, decomposition takes place which causes losses in nitric acid. These disadvantages are now to be obviated by the present invention. According to said invention the entire amount of sulfuric acid required for decomposition of the nitrate is first of all charged into the reaction chamber with only part, for instance half, of the nitrate charge and is heated therein to a temperature which is maintained so high, that although the entire amount of the nitrate introduced is transformed, only nitric acid of high percentage distils over. (Phase 1). Thereupon the second half or the rest of the nitrate charge is introduced into the reaction chamber into the treated mass contained therein and the temperature is raised. (Phase 2). Now, if in the second phase only highly concentrated acids are to be distilled off, the raising of temperature must only be carried to such a point that the water contained in the mass is not yet driven off. Now, when the distilling off of the concentrated nitric acid is finished, the residue of the reaction of the second phase or stage of the process is removed to a special reaction chamber where, under a further increase of temperature, the water contained and the nitric acid are driven off. (Phase 3).

The practical carrying out of the process will now be illustrated in detail in the following example, in connection with Chili saltpeter. For carrying out the process the three-pan system is most suitable, two of which are connected in parallel whereas the third is connected with the two other pans. All three pans are heated in a known manner. Preferably the work is done in such a way that while in the first pan one phase or stage of the process is taking place in the second pan the next phase or stage is taking place whereas the third pan is used for the last stage, or the driving off of the rest of the nitric acid. Assuming the pan 1 to be re-charged: without necessitating a cooling down of said pan, a portion, up to half, of the saltpeter charge is gradually introduced. This is done best by means of a mechanical feed conveyer or the like, while at the same time the total amount of sulfuric acid required for the conversion of the total charge of saltpeter is introduced. The charging of saltpeter is so regulated that always an excess of sulfuric acid is present in the pan. The temperature in the pan during this period of distillation is brought to and maintained at about 140° centigrade. According to the progress of the reaction the charge of saltpeter and sulfuric acid can be slowed down or speeded up. A transformation according to the following equation takes place:

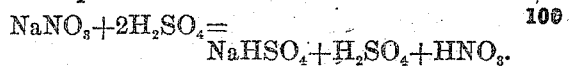

$$NaNO_3 + 2H_2SO_4 = NaHSO_4 + H_2SO_4 + HNO_3.$$

Now as with a prevailing temperature of about 140° the water present is retained by the excess of sulfuric acid, only highly concentrated nitric acid distils over; the residue consists of sodium bisulfate. This stage of the process being terminated the sulfuric acid charge is interrupted and the rest, or the second half, of the saltpeter charge is gradually, and correspondingly with the progress of the reaction, introduced into the pan. Simultaneously the temperature is raised to 160 to 170° centigrade. There is now a transformation between the fresh saltpeter and the sulfuric acid present which takes place according to the following equation:

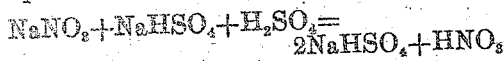

The acid obtained is likewise still concentrated but, in a degree corresponding with the increase of temperature, somewhat weaker than that of phase 1. After the end of this stage of the process the residue of reaction consisting of bisulfate, water, and nitric acid remainders, is introduced into the third pan where while the temperature is raised to about 250° centigrade and higher, it is completely dehydrated and freed from the last traces of nitric acid which is obtained as weak acid.

In the pan 2 the same process takes place as in pan 1, only always one stage removed. Instead of arranging the three pans with two of them in parallel the three pans may be connected in series, and then the first stage or phase can be carried out in the first pan, the second in the second pan and the third in the third pan. In this case in the first pan about one equivalent of saltpeter and two equivalents of sulfuric acid are introduced, and the temperature is maintained at 140°. After the completion of the first stage of the process the reaction residue of this stage of the process is introduced into the second pan and the rest of the saltpeter charge, but without any sulfuric acid, is gradually introduced. In the second pan the temperature is maintained at 260 to 270° centigrade. After the completion of the second stage of the process the residue is then introduced into the third pan, where it is subjected to the final treatment. Or, all the phases or stages of the process can be worked in one and the same pan. If instead of Chili-saltpeter as starting material other nitrate, as for instance lime nitrate, is used the required temperature and proportions in the individual stages have to be correspondingly altered.

The advance made by the new process consists in the fact that on the one hand, as has already been mentioned, the drawbacks of the processes used heretofore are obviated and on the other hand the following advantages are obtained: First, that by the division of the process into the different phases very concentrated nitric acid is obtained. Then, a very uniform distillation can be maintained because the introduction of the nitrate can be done more quickly or more slowly, according to the progress of the process and to the degree of heating, the consequences of this being, that the work is carried out in a hygienic manner and with freedom from danger. Finally, increased efficiency of production is attained, because it is not necessary to cool the pans from one charge to another one, as was heretofore required.

What I claim as my invention and desire to secure by Letters Patent is:—

1. The method of producing nitric acid by reaction between sulfuric acid and a predetermined quantity of nitrate, which comprises the initial operation of supplying to the sulfuric acid employed a part only of the nitrate, heating to a temperature at which the parts thus introduced will be decomposed but which will allow only nitric acid of high percentage to distil off, then introducing the remainder of the nitrate and heating further to effect its decomposition.

2. The method of producing nitric acid by reaction between sulfuric acid and a predetermined quantity of nitrate, which comprises the initial operation of supplying to the sulfuric acid employed a part only of the nitrate, heating to a temperature at which the part thus introduced will be decomposed but which will allow only nitric acid of high percentage to distil off, then introducing the remainder of the nitrate and heating further to effect its decomposition, the second heating being conducted in two stages in one of which it is so restricted as to permit only nitric acid of high percentage to distil off, and in the other of which it is increased to a degree sufficient to drive off the remainder of the nitric acid together with the accompanying water-vapor.

3. The method of producing nitric acid from sulfuric acid and a predetermined quantity of nitrate, which comprises an initial operation wherein the sulfuric acid and a part only of the nitrate are introduced simultaneously and gradually into the reaction vessel, their introduction being so regulated that during said initial operation the sulfuric acid is always in excess, heating to a temperature at which the nitrate, thus introduced will be decomposed but which will allow only nitric acid of high percentage to distil off; then adding the remainder of the nitrate, and effecting its decomposition.

4. The method of producing nitric acid from sulfuric acid and a predetermined quantity of nitrate, which comprises an initial operation wherein the sulfuric acid and a part only of the nitrate are introduced simultaneously and gradually into the reaction vessel, their introduction being so regulated that during said initial operation the sulfuric acid is always in excess, heating to a temperature at which the nitrate thus introduced will be decomposed but which will allow only nitric acid of high percentage to distil off; then adding the remainder of the nitrate, and effecting its decomposition, the introduction of the remainder of the nitrate being likewise gradual.

CARL UEBEL.

In the presence of—
GEORG LOPZ,
GOTTLIEB WERNER.